US012803785B2

(12) United States Patent
Kim et al.

(10) Patent No.: US 12,803,785 B2
(45) Date of Patent: Nov. 17, 2026

(54) ELECTRONIC DEVICE AND CONTROL METHOD FOR ESTIMATING MAXIMUM OR MINIMUM VALUE OF HOMOMORPHIC CIPHERTEXT

(71) Applicant: CRYPTO LAB INC., Seoul (KR)

(72) Inventors: Sulgi Kim, Seoul (KR); Yubeen Bae, Seoul (KR); Garam Lee, Seoul (KR); Hosik Choi, Yongin-si (KR); Sung Hee Hong, Seoul (KR)

(73) Assignee: CRYPTO LAB INC., Seoul (KR)

( * ) Notice: Subject to any disclaimer, the term of this patent is extended or adjusted under 35 U.S.C. 154(b) by 6 days.

(21) Appl. No.: 19/176,093

(22) Filed: Apr. 10, 2025

(65) Prior Publication Data

US 2025/0323778 A1 Oct. 16, 2025

(30) Foreign Application Priority Data

Apr. 11, 2024 (KR) ........................ 10-2024-0048838

(51) Int. Cl.
*H04L 9/00* (2022.01)
*G06F 17/11* (2006.01)
*H04L 9/06* (2006.01)

(52) U.S. Cl.
CPC .............. *H04L 9/008* (2013.01); *G06F 17/11* (2013.01); *H04L 9/0637* (2013.01)

(58) Field of Classification Search
CPC ....................................................... H04L 9/008
See application file for complete search history.

(56) References Cited

U.S. PATENT DOCUMENTS

2019/0065974 A1* 2/2019 Michigami ............ G06N 3/045
2021/0344479 A1* 11/2021 Lee .......................... H04L 9/008
2022/0385448 A1* 12/2022 Honorio Araujo da Silva ............ H04L 9/14
2024/0273218 A1* 8/2024 No ......................... G06F 21/602

* cited by examiner

*Primary Examiner* — Bradley W Holder
(74) *Attorney, Agent, or Firm* — Steinfl + Bruno LLP

(57) ABSTRACT

An electronic device and control method for estimating a maximum value or a minimum value of a homomorphic ciphertext are provided. The electronic device includes a communication device, a memory configured to store at least one instruction, and a processor configured to be connected to the memory for controlling the electronic device. The processor may be configured to acquire a homomorphic ciphertext composed of N pieces of data, acquire a sample homomorphic ciphertext composed of B pieces of data from the homomorphic ciphertext, estimate a sample minimum value of the sample homomorphic ciphertext using a Boltzmann operator, acquire a tuning parameter using the estimated sample minimum value, correct the Boltzmann operator by applying the tuning parameter to the Boltzmann operator, and estimate a maximum value or a minimum value of the homomorphic ciphertext using the corrected Boltzmann operator.

14 Claims, 5 Drawing Sheets

FIG. 4

| CASE | DATA SIZE(N) | METHOD | ANSWER (ACTUAL MAX) | RESULT | CIPHERTEXT TIME | TIME RATIO | ERROR | ERROR RATE |
|---|---|---|---|---|---|---|---|---|
| 1 | 1,000,000 | COMPARE-BASED (EXISTING) | 13.2937 | 13.29366 | 2.235041 | 0.32713 | 0.000000 | 0.00000 |
| | 1,000,000 | Boltzmann-BASED (PROPOSE) | 13.2937 | 12.99985 | 0.731154 | | 0.293810 | 0.02210 |
| 2 | 100,000 | COMPARE-BASED (EXISTING) | 117.4137 | 117.4137 | 0.829669 | 0.20612 | 0.000010 | 0.00000 |
| | 100,000 | Boltzmann-BASED (PROPOSE) | 117.4137 | 116.43529 | 0.171008 | | 0.978420 | 0.00833 |
| 3 | 100,000 | COMPARE-BASED (EXISTING) | 107.2228 | 107.22279 | 0.63102 | 0.15054 | 0.000000 | 0.00000 |
| | 100,000 | Boltzmann-BASED (PROPOSE) | 107.2228 | 105.23028 | 0.094996 | | 1.992510 | 0.01858 |
| 4 | 100,000 | COMPARE-BASED (EXISTING) | 139.4338 | 139.43379 | 0.916118 | 0.16369 | 0.000020 | 0.00000 |
| | 100,000 | Boltzmann-BASED (PROPOSE) | 139.4338 | 138.87017 | 0.149961 | | 0.563640 | 0.00404 |
| 5 | 100,000 | COMPARE-BASED (EXISTING) | 99.9999 | 99.99991 | 0.000329 | 0.75684 | 0.000000 | 0.00000 |
| | 100,000 | Boltzmann-BASED (PROPOSE) | 99.9999 | 98.49711 | 0.000249 | | 1.502800 | 0.01503 |
| 6 | 1,000 | COMPARE-BASED (EXISTING) | 102.2435 | 102.24348 | 0.000555 | 0.11171 | 0.000000 | 0.00000 |
| | 1,000 | Boltzmann-BASED (PROPOSE) | 102.2435 | 102.23603 | 6.20E-05 | | 0.007450 | 0.00007 |
| 7 | 1,000 | COMPARE-BASED (EXISTING) | 122.6922 | 122.69218 | 0.000145 | 0.53103 | 0.000000 | 0.00000 |
| | 1,000 | Boltzmann-BASED (PROPOSE) | 122.6922 | 122.68275 | 7.70E-05 | | 0.009430 | 0.00008 |

FIG. 5

| CASE | DATA SIZE(N) | METHOD | ANSWER (ACTUAL MAX) | RESULT | CIPHERTEXT TIME | TIME RATIO | ERROR | ERROR RATE |
|---|---|---|---|---|---|---|---|---|
| 1 | 2,000 | COMPARE-BASED (EXISTING) | 221 | 220.999986 | 2.039401 | 0.04176 | 0.000014 | 0.000000 |
| | 2,000 | Boltzmann-BASED (PROPOSE) | 221 | 218.785618 | 0.085158 | | 2.214380 | 0.010020 |
| 2 | 2,000 | COMPARE-BASED (EXISTING) | 222 | 221.999985 | 1.966558 | 0.04072 | 0.000015 | 0.000000 |
| | 2,000 | Boltzmann-BASED (PROPOSE) | 222 | 220.659704 | 0.080082 | | 1.340300 | 0.006037 |
| 3 | 2,000 | COMPARE-BASED (EXISTING) | 223 | 223.000001 | 2.016438 | 0.04031 | 0.000001 | 0.000000 |
| | 2,000 | Boltzmann-BASED (PROPOSE) | 223 | 220.227683 | 0.081273 | | 2.772320 | 0.012432 |
| 4 | 2,000 | COMPARE-BASED (EXISTING) | 226 | 225.999992 | 1.248509 | 0.04041 | 0.000008 | 0.000000 |
| | 2,000 | Boltzmann-BASED (PROPOSE) | 226 | 223.785289 | 0.050449 | | 2.214710 | 0.009800 |

ELECTRONIC DEVICE AND CONTROL METHOD FOR ESTIMATING MAXIMUM OR MINIMUM VALUE OF HOMOMORPHIC CIPHERTEXT

CROSS-REFERENCE TO RELATED APPLICATIONS

This application claims the benefit of priority from Korean Patent Application No. 10-2024-0048838, filed on Apr. 11, 2024, in the Korean Intellectual Property Office, the disclosures of which are incorporated herein by reference in their entirety.

BACKGROUND

1. Field

The disclosure relates to an electronic device and control method for estimating a maximum value or a minimum value of a homomorphic ciphertext, and more particularly, to an electronic device and control method for estimating a maximum value or a minimum value of a homomorphic ciphertext using a Boltzmann operator.

2. Description of the Related Art

As communication technology develops and electronic devices spread, efforts are continuously made to maintain communication security between the electronic devices. Accordingly, encryption/decryption technology is used in most communication environments.

When messages encrypted by the encryption technology are delivered to the other party, the other party needs to perform decryption in order to use the messages. In this case, the other party wastes resources and time during decrypting the encrypted data. In addition, when the third party hacks messages while the other party temporarily decrypts the messages for operation, there is a problem in that the messages may be easily leaked to the third party.

In order to solve this problem, a homomorphic encryption method is being studied. According to the homomorphic encryption, even if an operation is performed on ciphertexts themselves without decrypting the encrypted information, it is possible to obtain the same result as the encrypted value after an operation on a plain text. Accordingly, various types of operations may be performed without decrypting the ciphertext.

Meanwhile, the need for a method of effectively finding a maximum value or a minimum value, which is an extreme value of a plurality of homomorphic ciphertexts acquired from a plurality of electronic devices, has been continuously raised. Conventionally, the maximum or minimum value of the plurality of homomorphic ciphertexts was found based on comparison operations. The method of finding a maximum value or a minimum value of a plurality of homomorphic ciphertexts using a comparison operation had relatively high accuracy, but there were limitations in operation speed and efficiency, and there was a problem that the computational cost for finding an extreme value (maximum or minimum value) in big data was excessive.

SUMMARY

The disclosure has been made to solve the above-described problems, and an object of the disclosure provides an electronic device and control method for estimating a maximum value or a minimum value of a homomorphic ciphertext using a Boltzmann operator to quickly and effectively calculate an extreme value of the homomorphic ciphertext.

Technical Solution

According to an aspect of the disclosure, an electronic device for estimating a maximum value or minimum value of a homomorphic ciphertext includes: a communication device; a memory configured to store at least one instruction; and a processor configured to be connected to the memory to control the electronic device, in which the processor is configured to: acquire a homomorphic ciphertext composed of N pieces of data, acquire a sample homomorphic ciphertext composed of B pieces of data from the homomorphic ciphertext, estimate a sample minimum value of the sample homomorphic ciphertext using a Boltzmann operator, acquire a tuning parameter using the estimated sample minimum value, correct the Boltzmann operator by applying the tuning parameter to the Boltzmann operator, and estimate a maximum value or a minimum value of the homomorphic ciphertext using the corrected Boltzmann operator.

The Boltzmann operator may be defined as in the following Equation.

$$S_{max}(x_1, \ldots , x_N) = \frac{\sum_{i=1}^{N} x_i e^{\alpha(x_i-c)}}{\sum_{i=1}^{N} e^{\alpha(x_i-c)}}$$

The processor may be configured to calculate the maximum or minimum value through the following condition.

$$\lim_{\alpha\to\infty} S_\alpha = x_{max},\ \lim_{\alpha\to-\infty} S_\alpha = x_{min}$$

Here, $x_i$ may be the homomorphic ciphertext, a and c may be parameters, $x_{max}$ may be a maximum value, and $x_{min}$ may be a minimum value.

The B may be the number of data included in one data block.

The processor may be configured to acquire a plurality of sample groups including the sample homomorphic ciphertext, acquire sample minimum values of each of the plurality of sample groups, and acquire a maximum value among the plurality of acquired sample minimum values as a tuning parameter.

The processor may be configured to correct the Boltzmann operator as in the following equation using the tuning parameter.

$$S_\alpha(x_1, \ldots , x_N) = \frac{\sum_{i=1}^{N} (x_i - c)e^{\alpha(x_i-c)}}{\sum_{i=1}^{N} e^{\alpha(x_i-c)}} + c$$

Here, C may be a tuning parameter.

The processor may be configured to remove the parameter and tuning parameter from the corrected Boltzmann operator to estimate the maximum value or the minimum value using the following Equation.

$$S(x_1, \ldots, x_N) = \frac{\sum_{i=1}^{N} x_i e^{x_i}}{\sum_{i=1}^{N} e^{x_i}}$$

The processor may be configured to estimate the maximum value or minimum value by using the following Equation, which corrects an exponential function to a polynomial in the Equation from which the parameter and tuning parameter are removed.

$$S(x_1, \ldots, x_N) = \frac{\sum_{i=1}^{N} x_i^{2^k+1}}{\sum_{i=1}^{N} x_i^{2^k}}$$

According to another aspect of the disclosure, a control method of an electronic device for estimating a maximum value or minimum value of a homomorphic ciphertext includes: acquiring a homomorphic ciphertext composed of N pieces of data; acquiring a sample homomorphic ciphertext composed of B pieces of data from the homomorphic ciphertext; estimating a sample minimum value of the B pieces of sample homomorphic ciphertexts using a Boltzmann operator; acquiring a tuning parameter using the estimated sample minimum value; correcting the Boltzmann operator by applying the tuning parameter to the Boltzmann operator; and estimating a maximum value or a minimum value of the homomorphic ciphertext using the corrected Boltzmann operator.

The Boltzmann operator may be defined as in the following Equation.

$$S_{max}(x_1, \ldots, x_N) = \frac{\sum_{i=1}^{N} x_i e^{\alpha(x_i - c)}}{\sum_{i=1}^{N} e^{\alpha(x_i - c)}}$$

The processor may be configured to calculate the maximum or minimum value through the following condition.

$$\lim_{\alpha \to \infty} S_\alpha = x_{max}, \quad \lim_{\alpha \to -\infty} S_\alpha = x_{min}$$

Here, $x_i$ may be the homomorphic ciphertext, a and c may be parameters, $x_{max}$ may be a maximum value, and $x_{min}$ may be a minimum value.

The B may be the number of data included in one data block.

In the acquiring of the tuning parameter, a plurality of sample groups including the sample homomorphic ciphertext may be acquired, sample minimum values of each of the plurality of sample groups may be acquired, and a maximum value among the plurality of acquired sample minimum values may be acquired as a tuning parameter.

In the correcting, the Boltzmann operator may be corrected as in the following equation using the tuning parameter.

$$S_\alpha(x_1, \ldots, x_N) = \frac{\sum_{i=1}^{N} (x_i - c) e^{\alpha(x_i - c)}}{\sum_{i=1}^{N} e^{\alpha(x_i - c)}} + c$$

Here, C may be a tuning parameter.

In the estimating of the maximum value or the minimum value, the parameter and tuning parameter may be removed from the corrected Boltzmann operator to estimate the maximum value or the minimum value using the following Equation.

$$S(x_1, \ldots, x_N) = \frac{\sum_{i=1}^{N} x_i e^{x_i}}{\sum_{i=1}^{N} e^{x_i}}$$

As described above, according to various embodiments of the disclosure, it is possible to reduce the computational cost required to quickly find the extreme value in big data including the homomorphic ciphertext. In particular, it is possible to quickly find the maximum or minimum value of the homomorphic ciphertext in various applications such as cloud computing and machine learning.

BRIEF DESCRIPTION OF THE DRAWINGS

FIG. 4 and FIG. 5 are tables for describing simulation results for the accuracy and measurement time of the maximum value estimated by a conventional method and a method of the disclosure.

DETAILED DESCRIPTION OF EXEMPLARY EMBODIMENTS

Figure 1:
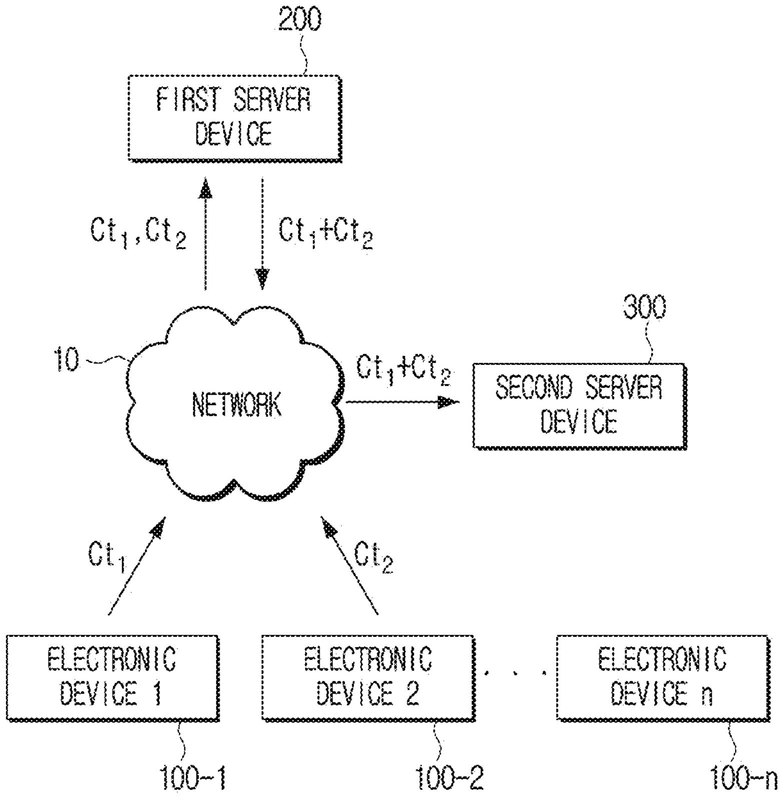
FIG. 1 is a diagram for describing a structure of a network system according to an embodiment of the disclosure.

Hereinafter, the disclosure will be described in detail with reference to the accompanying drawings. Encryption/decryption may be applied to an information (data) transmission process performed in the disclosure if necessary, and all expressions describing the information (data) transmission process in the disclosure and claims should be interpreted as including cases of encryption/decryption even if not separately stated. In the disclosure, expressions such as "transmission (delivery) from A to B" or "A receiving from B" include transmission (delivery) or reception with another medium included therebetween, and does not necessarily express only what is directly transmitted (delivered) or received from A to B.

In the description of the disclosure, the order of each step should be understood as non-limiting unless the preceding step needs to be logically and temporally performed necessarily before the following step. In other words, except for the above exceptional cases, even if the process described as the following step is performed before the process described as the preceding step, the nature of the disclosure is not affected, and the scope should also be defined regardless of the order of the steps. In this specification, "A or B" is defined to mean not only selectively indicating either one of A and B, but also including both A and B. In addition, in the disclosure, the term "include" has a meaning encompassing further including other components in addition to elements listed as included.

In this disclosure, only essential components necessary for the description of the disclosure are described, and components unrelated to the essence of the disclosure are not mentioned. In addition, it should not be interpreted as an exclusive meaning that includes only the mentioned components, but should be interpreted as a non-exclusive meaning that may include other components.

In addition, in the disclosure, "value" is defined as a concept including a vector as well as a scalar value. In the disclosure, the expressions such as "compute" and "calculate" may be replaced by an expression that produces a result of the corresponding computation or operation. In addition, unless otherwise stated, operation on a ciphertext to be described below means a homomorphic operation. For example, an addition of the homomorphic ciphertext means a homomorphic addition of two homomorphic ciphertexts.

Mathematical operations and calculations of each step of the disclosure to be described below may be implemented as computer operations by the known coding method and/or coding designed to suit the disclosure in order to perform the corresponding operations or calculations.

Specific equations to be described below are illustratively described among possible alternatives, and the scope of the disclosure should not be construed as being limited to equations mentioned in the disclosure.

For convenience of description, in the disclosure, a notation is defined as follows.

$a \leftarrow D$: select element (a) according to distribution (D)

s1, s2 $\in$ R: S1, S2: Each of S1 and S2 is an element belonging to set R.

mod (q): Modular operation with element q $\lfloor \cdot \rceil$: Round-off internal value Hereinafter, various embodiments of the disclosure will be described in detail with reference to the accompanying drawings.

FIG. 1 is a diagram for describing a structure of a network system according to an embodiment of the disclosure.

Referring to FIG. 1, a network system may include a plurality of electronic devices 100-1 to **100-*n*, a first server device 200, and a second server device 300, each of which may be connected to each other through a network 10**.

The network 10 may be implemented in various types of wired and wireless communication networks, broadcasting communication networks, optical communication networks, cloud networks, etc., and each device may also be connected through methods such as Wi-Fi, Bluetooth, near field communication (NFC), etc., without a separate medium.

Although FIG. 1 illustrates the plurality of electronic devices 100-1 to **100-*n*, a plurality of electronic devices are not necessarily used, and one device may be used. For example, the electronic devices 100-1 to 100-*n* may be implemented as various types of devices such as smart phones, tablets, game players, PCs, laptop PCs, home servers, and kiosks. In addition, the electronic devices 100-1 to 100-*n*** may be implemented in the form of home appliances to which an IoT function is applied.

Users may input various types of information through the electronic devices 100-1 to **100-*n* they use. The input information may be stored in the electronic devices 100-1 to 100-*n* themselves, but may also be transmitted to and stored in an external device for storage capacity and security reasons. In FIG. 1, the first server device 200 may serve to store such information, and the second server device 300 may serve to use some or all of the information stored in the first server device 200**.

Each electronic devices 100-1 to **100-*n* may homomorphically encrypt the input information and transmit a homomorphic ciphertext to the first server device 200**.

Each of the electronic devices 100-1 to **100-*n* may include encryption noise, i.e., an error, calculated during performing homomorphic encryption in a ciphertext. Specifically, the homomorphic ciphertext generated by each of the electronic devices 100-1 to 100-*n*** may be generated in a form in which a result value including a message and an error value is restored when decrypted later using a secret key.

For example, when the homomorphic ciphertext generated by the electronic devices 100-1 to **100-*n*** are decrypted using a secret key, the homomorphic ciphertext may be generated in a form that satisfies the following natures.

$$Dec(ct \cdot sk) = \ < ct \cdot sk >= M + e(\mathrm{mod}\ o) = M + e(\mathrm{mod}\ q)'' > \quad \text{[Equation 1]}$$

Here, <, > denotes a dot product operation (usual inner product), ct denotes a ciphertext, sk denotes a secret key, M denotes a plain text message, e denotes an encryption error value, and mod q denotes a modulus of a ciphertext. q should be selected to be greater than a result value M obtained by multiplying a scaling factor $\Delta$ by a message. When an absolute value of the error value e is sufficiently small compared to M, a decryption value M+e of the ciphertext is a value that may replace the original message with the same precision in significant figure operation. Among the decrypted data, an error may be arranged on the least significant bit (LSB) side, and M may be arranged on the next least significant bit side.

When a size of the message is too small or too large, the size may be adjusted using a scaling factor. When the scaling factor is used, not only an integer type message but also a real number type message may be encrypted, and thus, the usability of the message may be greatly increased. In addition, by adjusting the size of the message using the scaling factor, a size of an area where messages exist in the ciphertext after the operation is made, that is, a size of an effective area may also be adjusted.

According to the embodiment, a modulus q of the ciphertext may be set and used in various forms. For example, the modulus of the ciphertext may be set in the form of an exponential power $q=\Delta^L$ of the scaling factor $\Delta$. When $\Delta$ is 2, A may be set to a value such as $q=2^{10}$.

In addition, the homomorphic ciphertext according to the disclosure is described on the assumption that a fixed point is used, but may be applied even when a floating point is used.

The first server device 200 may store the received homomorphic ciphertext in a ciphertext state without decrypting the received homomorphic ciphertext.

The second server device 300 may request a specific processing result for the homomorphic ciphertext from the first server device 200. The first server device 200 may perform a specific operation according to the request of the second server device 300 and then transmit the result to the second server device 300.

For example, when ciphertexts ct1 and ct2 transmitted by the two electronic devices 100-2 and 100-2 are stored in the first server device 200, the second server device 300 may request, from the first server device 200, a value obtained by summing information provided from the two electronic devices 100-2 and 100-2. The first server device 200 may perform an operation for summing two ciphertexts according to the request, and then transmit the result value $ct_1+ct_2$ to the second server device 300.

Due to the nature of the homomorphic ciphertext, the first server device 200 may perform the operation without the decryption, and the result value is also in the form of a ciphertext. In the disclosure, the result value obtained by the operation is referred to as an operated ciphertext.

The first server device 200 may transmit the operated ciphertext to the second server device 300. The second server device 300 may decrypt the received operated ciphertext and acquire operated result values of data included in each homomorphic ciphertext.

Meanwhile, FIG. 1 illustrates a case where the first electronic device and the second electronic device perform the encryption and the second server device performs the decryption, but is not necessarily limited thereto.

In addition, the electronic device 100 (or the first server device 200) may acquire an extreme value (e.g., a maximum value or a minimum value) for a plurality of homomorphic ciphertexts. In particular, the first server device 200 may estimate the extreme values of the plurality of homomorphic ciphertexts using a Boltzmann operator. In this case, the Boltzmann operator may be defined as a function to approximately acquire the maximum or minimum value within a distribution, as in the following Equation 2.

$$S_{max}(x_1, \ldots , x_N) = \frac{\sum_{i=1}^{N} x_i e^{\alpha(x_i - c)}}{\sum_{i=1}^{N} e^{\alpha(x_i - c)}} \quad \text{[Equation 2]}$$

$$\lim_{\alpha \to \infty} S_\alpha = x_{max}, \quad \lim_{\alpha \to -\infty} S_\alpha = x_{min}$$

Here, $x_i$ may be the homomorphic ciphertext, a and c may be parameters, $x_{max}$ may be a maximum value, and $x_{min}$ may be a minimum value. In addition, a is an arbitrary constant belonging to $(-\infty, \infty)$.

In an embodiment, the electronic device 100 may correct the Boltzmann operator based on sample minimum values of sample homomorphic ciphertexts among the plurality of homomorphic ciphertexts, and estimate the maximum or minimum value of the plurality of homomorphic ciphertexts using the corrected Boltzmann operator.

In another embodiment, the electronic device 100 may remove a constant from the corrected Boltzmann operator, and estimate the maximum or minimum value of the plurality of homomorphic ciphertexts using the Boltzmann operator with the constant removed.

In another embodiment, the electronic device 100 may convert an exponential function of the Boltzmann operator into a polynomial function that is friendly to the homomorphic ciphertext, and estimate the maximum or minimum value of the plurality of homomorphic ciphertexts using the Boltzmann operator including the polynomial function. This will be described in detail below.

As described above, by estimating the extreme values of the plurality of homomorphic ciphertexts using the Boltzmann operator, the time and cost required to find the extreme values in big data may be greatly reduced.

Figure 2:
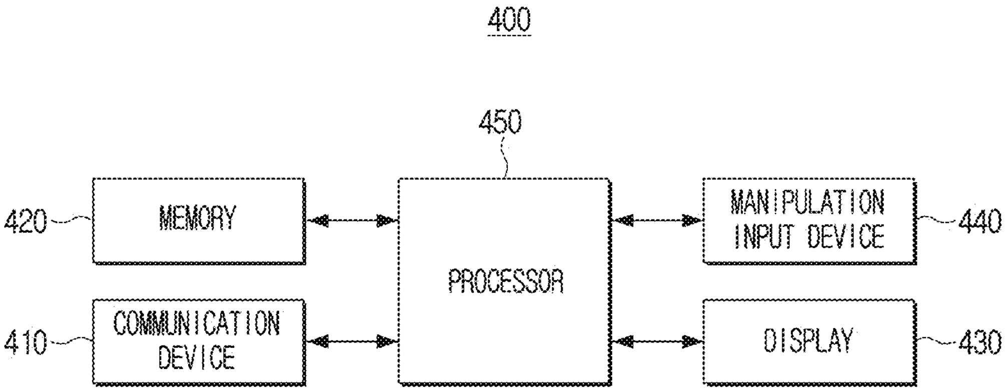
FIG. 2 is a block diagram illustrating a configuration of an operation device according to an embodiment of the disclosure.

FIG. 2 is a block diagram illustrating a configuration of an operation device according to an embodiment of the disclosure.

Specifically, in the system of FIG. 1, not only a device that performs the homomorphic encryption, such as the electronic device, but also a device that operates the homomorphic ciphertext, such as the first server device, a device that decrypts the homomorphic ciphertext, such as the second server device, etc., may also be referred to as the electronic device. The electronic device may be various devices such as a personal computer (PC), a laptop computer, a smart phone, a tablet, and a server.

Referring to FIG. 2, an electronic device 400 may include a communication device 410, a memory 420, a display 430, a manipulation input device 440, and a processor 450.

The communication device 410 is formed to connect the electronic device 400 to an external device (not illustrated), and may be connected to the external device through a local area network (LAN) and the Internet network or be connected to the external device through a USB port or a wireless communication (for example, wireless fidelity (WiFi), 802.11a/b/g/n, near field communication (NFC), or Bluetooth) port. Such a communication device 410 may also be referred to as a transceiver.

The communication device 410 may receive the public key from the external device and may transmit the public key generated by the electronic device 400 itself to an external device.

Also, the communication device 410 may receive a message from the external device and transmit the generated homomorphic ciphertext to the external device. In an embodiment, the communication device 410 may acquire N homomorphic ciphertexts from a plurality of external devices.

Also, the communication device 410 may receive various parameters required for generating a ciphertext from an external device. Meanwhile, upon implementation, various parameters may be directly received from a user through the manipulation input device 440 to be described later.

In addition, the communication device 410 may receive a request for the operation of the homomorphic ciphertext from an external device and transmit the calculated result to the external device. In an embodiment, the communication device 410 may transmit the results of the extreme values (e.g., maximum or minimum values) of the plurality of homomorphic ciphertexts to the external device.

The memory 420 is a component for storing O/S for driving the electronic device 400, various software, data, and the like. The memory 420 may be implemented in various forms such as RAM, ROM, flash memory, HDD, external memory, and memory card, but is not limited to any one.

The memory 420 stores the message to be encrypted. Here, the message may be various types of credit information, personal information, and the like cited by a user, and may also be information related to location information used in the electronic device 400 and a use history such as Internet usage time information.

In addition, the memory 420 may store a public key, and when the electronic device 400 is a device that directly generates the public key, the memory 420 may store not only a secret key, but also various parameters necessary for generating the public key and the secret key.

The memory 420 may store the homomorphic ciphertext generated by the electronic device 100. Also, the memory 420 may store the homomorphic ciphertext transmitted from the external device.

In addition, the memory 420 may store various modules or functions for acquiring extreme values of the plurality (N) of homomorphic ciphertexts acquired by the electronic device 100. For example, the memory 420 may store the plurality of functions acquired using the Boltzmann operator.

The display 430 displays a user interface window for selecting a function supported by the electronic device 400. Specifically, the display 430 may display a user interface window for selecting various functions provided by the electronic device 400'. The display 430 may be a monitor such as a liquid crystal display (LCD) and organic light emitting diodes (OLED), and may be implemented as a touch screen capable of simultaneously performing the functions of the manipulation input device 440 to be described later.

The display 430 may display a message requesting input of parameters necessary for generating a secret key and a public key. Also, the display 430 may display a message in which an encryption target selects a message. Meanwhile, in implementation, the encryption target may be directly selected by a user or may be automatically selected. That is, personal information or the like that requires encryption may be automatically set even if a user does not directly select a message.

The manipulation input device 440 may select a function of the electronic device 400 and receive a control command for the function from the user. Specifically, the manipulation input device 440 may receive parameters necessary for generating a secret key and a public key from the user. Also, the manipulation input device 440 may receive the message to be encrypted from the user.

In an embodiment, the manipulation input device 440 may receive a user command to acquire the extreme values of the plurality of homomorphic ciphertexts.

The processor 450 may control each component of the electronic device 400. The processor 450 may be composed of a single device such as a central processing unit (CPU) and an application-specific integrated circuit (ASIC), or may be composed of a plurality of devices such as a CPU and a graphics processing unit (GPU).

In this case, the processor 450 may have architecture that may process 32-bit data at once.

When the message to be transmitted is input, the processor 450 stores the message in the memory 420. The processor 450 uses various setting values and programs stored in the memory 420 to homomorphically encrypt the message. In this case, the public key may be used.

The processor 450 may generate and use a public key required to perform encryption by itself, or may receive and use the public key from an external device. For example, the second server device 300 that performs the decryption may distribute a public key to other devices.

When generating a key by itself, the processor 450 may generate a public key using a Ring-LWE technique. Describing specifically, the processor 450 may first set various parameters and rings and store the parameters and rings in the memory 420. Examples of the parameters may include lengths of plain text message bits, sizes of public and secret keys, and the like.

The ring may be expressed as Equation 3 below:

$$R = Z_q[X]/f(x) \quad \text{[Equation 3]}$$

Here, R denotes a ring, $Z_q$ denotes a coefficient, and f(x) denotes an n-th polynomial.

The ring is a set of polynomials having predetermined coefficients, and means a set in which addition and multiplication are defined between elements and which is closed for addition and multiplication. Such a ring may be referred to as an annulus.

For example, the ring means a set of n-th polynomials having a coefficient $Z_q$. Specifically, when n is Φ(N), it refers to polynomials that may be calculated as the remainder of dividing the polynomial by an N-th cyclotomic polynomial. f(x) denotes ideal of $Z_q$ [x] generated by the f(x). The Euler totient function Φ(N) means the number of natural numbers that is coprime to N and smaller than N. When $\Phi_N$ (x) is defined as an N-th cyclotomic polynomial, the ring may also be expressed by Equation 4 as follows.

$$R = Z_q[X]/\phi_N(x) \quad \text{[Equation 4]}$$

A secret key sk may be represented as follows.

Meanwhile, the ring of Equation 3 described above has a complex number in the plain text space. Meanwhile, in order to improve the operation speed of the homomorphic ciphertext, only a set in which the plain text space is a real number in the above-described set of rings may be used.

When such a ring is set, the processor 450 may calculate the secret key sk from the ring.

$$sk \leftarrow (1, s(x)),\ s(x) \in R \quad \text{[Equation 5]}$$

Here, s(x) means a polynomial generated randomly with small coefficients.

The processor 450 calculates a first random polynomial a (x) from the ring. The first random polynomial may be expressed as follows.

$$a(x) \leftarrow A \quad \text{[Equation 6]}$$

In addition, the processor 450 may calculate an error. Specifically, the processor 450 may extract an error from a discrete Gaussian distribution or a distribution statistically close to the discrete Gaussian distribution. This error may be expressed as follows.

$$e(x) \leftarrow D^{\tau}_{ac} \quad \text{[Equation 7]}$$

When the error is calculated, the processor 450 may calculate a second random polynomial by performing a modular operation on the error in the first random polynomial and the secret key. The second random polynomial may be expressed as follows.

$$b(x) = -a(x)s(x) = e(x)(\text{mod } o) \quad \text{[Equation 8]}$$

Finally, a public key pk is set as follows in a form including the first random polynomial and the second random polynomial.

$$pk = (b(x), a(x)) \quad \text{[Equation 9]}$$

Since the above-described key generation method is only an example, it is not necessarily limited thereto, and it goes without saying that the public key and the secret key may be generated by other methods.

Meanwhile, when a public key is generated, the processor 450 may control the communication device 410 to transmit the public key to other devices.

The processor 450 may generate a homomorphic ciphertext for a message. Specifically, the processor 450 may generate a homomorphic ciphertext by applying the previously generated public key to the message. In this case, the processor 450 may generate the length of the ciphertext to correspond to the size of the scaling factor Δ.

When the homomorphic ciphertext is generated, the processor 450 may control the communication device 410 to store the homomorphic ciphertext in the memory 420 or transmit the homomorphic ciphertext to another device according to a user request or a preset default command.

Meanwhile, the processor 450 may acquire the extreme values of the plurality of homomorphic ciphertexts using the Boltzmann operator. This will be described in more detail with reference to FIG. 3.

Figure 3:
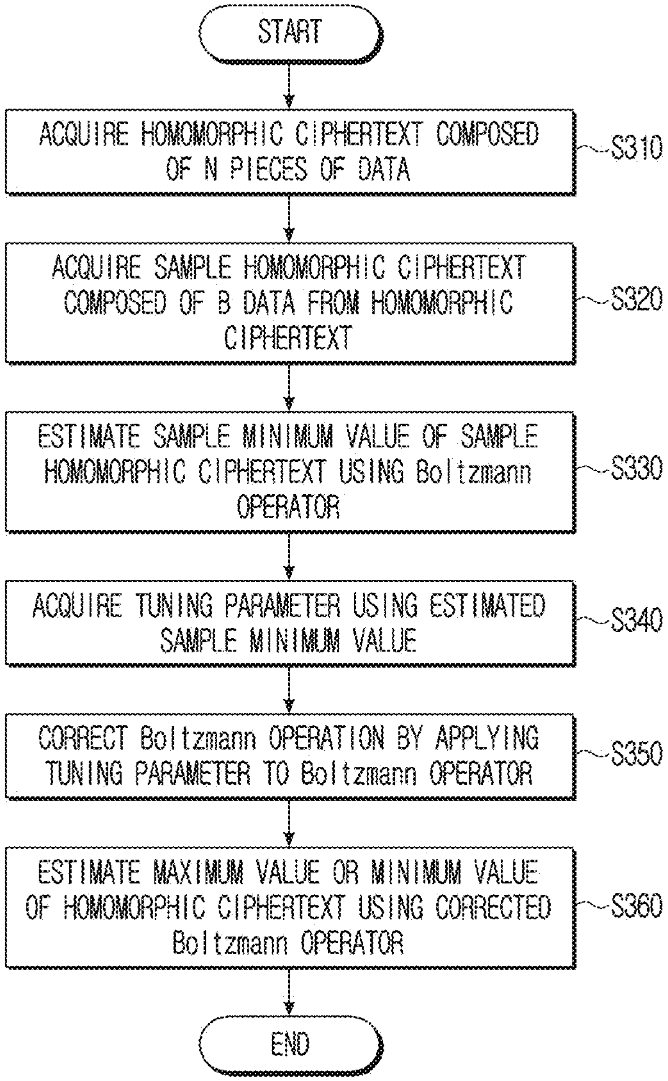
FIG. 3 is a flowchart for describing an electronic device and control method for estimating a maximum value or a minimum value of a homomorphic ciphertext according to an embodiment of the disclosure.

FIG. 3 is a flowchart for describing an electronic device and control method for estimating a maximum or minimum value of a homomorphic ciphertext according to an embodiment of the disclosure.

First, the electronic device 100 may acquire the homomorphic ciphertext composed of N pieces of data (S310). Specifically, the electronic device 100 may acquire the plurality of homomorphic ciphertexts from the external device and acquire the plurality of homomorphic ciphertexts stored in the electronic device 100. Here, the homomorphic ciphertext may be data encrypted by a homomorphic encryption algorithm of various types of data.

In addition, the electronic device 100 may receive not only the homomorphic ciphertext composed of N pieces of data, but also a parameter α of the Boltzmann operator.

In addition, a is an arbitrary constant belonging to (−∞, ∞).

Meanwhile, the Boltzmann operator is an operator for approximately acquiring the extreme value, and may be defined as in the following Equation 10.

$$S_{max}(x_1, \ldots, x_N) = \frac{\sum_{i=1}^{N} x_i e^{\alpha(x_i - c)}}{\sum_{i=1}^{N} e^{\alpha(x_i - c)}}, \quad \text{[Equation 10]}$$

$$\lim_{\alpha\to\infty} S_\alpha = x_{max}, \quad \lim_{\alpha\to-\infty} S_\alpha = x_{min}$$

In this case, x=(x1,x2, . . . ,xN) may represent N input data. α and c may be parameters, $x_{max}$ may be a maximum value, and $x_{min}$ may be a minimum value.

That is, the electronic device 100 may estimate the maximum value $x_{max}$ or minimum value $x_{min}$ using the Boltzmann operator.

The electronic device 100 may acquire the sample homomorphic ciphertext composed of B pieces of data from the homomorphic ciphertext (S320). Specifically, the electronic device 100 may randomly sample B pieces of data from N pieces of data. In this case, B is a natural number smaller than N and may be the number of data included in one block. For example, B may be 32,768, but is not limited thereto. In this case, the data of the sampled sample homomorphic ciphertext z may be referred to as z=(z1, . . . ,z32768).

In addition, the electronic device 100 may acquire the sample homomorphic ciphertexts of the plurality (n) of sample groups. That is, the electronic device 100 may acquire the plurality of sample groups each including the sample homomorphic ciphertext composed of B pieces of data.

The electronic device 100 may estimate the sample minimum value of the sample homomorphic ciphertext using the Boltzmann operator (S330). Specifically, the electronic device 100 may acquire the sample minimum values of each of the plurality of sample groups using the Boltzmann operator. That is, the electronic device 100 may acquire the sample minimum value $z_{min}$ of each of n sample groups using Equation 10.

The electronic device 100 may acquire the tuning parameter using the estimated sample minimum value (S340). Specifically, the electronic device 100 may acquire the tuning parameter using the maximum value among the sample minimum values acquired from the plurality of sample groups.

In an embodiment, the electronic device 100 may acquire a tuning parameter C based on Equation 11.

$$C = \beta * z_{max} \quad \text{[Equation 11]}$$

In this case, C may be the tuning parameter, $z_{max}$ may be the maximum value among the sample minimum values, and B may be the constant. In this case, β may be an empirical constant value, for example, 1.05, but is not limited thereto.

In this case, the tuning parameter C may be a value set to shift the data of the entire homomorphic ciphertext toward 0 in order to maximize the effect of extracting the maximum value using the Boltzmann operator. For example, when it is assumed that a height of an adult male is between 160 and 190, when 160 is subtracted from all values and the data is shifted between 0 and 30, it may be more effective for the electronic device 100 to apply the Boltzmann operator to the shifted values than to directly apply the Boltzmann operator to the values between 160 and 190, which are the existing data.

The electronic device 100 may correct the Boltzmann operator by applying the tuning parameter to the Boltzmann operator (S350). Specifically, the electronic device 100 may correct the Boltzmann operator by subtracting the tuning parameter from the homomorphic ciphertext applied to the Boltzmann operator ($x_i$-C) as in the Equation 12 below, and then adding the tuning parameter again at the end.

$$S_\alpha(x_1, \ldots, x_N) = \frac{\sum_{i=1}^{N} (x_i - c) e^{\alpha(x_i - c)}}{\sum_{i=1}^{N} e^{\alpha(x_i - c)}} + c \quad \text{[Equation 12]}$$

The electronic device 100 may estimate the maximum or minimum value of the homomorphic ciphertext composed of N pieces of data using the corrected Boltzmann operator (S360). Specifically, the electronic device 100 may estimate the maximum or minimum value of the N pieces of data using the Boltzmann operator of the Equation 12 that corrects the Boltzmann operator of the above Equation 10. That is, the electronic device 100 may estimate the maximum value $x_{max}$ and the minimum value $x_{min}$ of N homomorphic ciphertexts by applying α→∞ or α→−∞ in the above Equation 12.

Meanwhile, according to an embodiment of the disclosure, the electronic device 100 may not consider the parameters and tuning parameters in the above Equation 12 depending on the distribution of the homomorphic ciphertext. That is, the electronic device 100 may estimate the maximum or minimum values of N pieces of data by using the Boltzmann operator with the parameters and tuning parameters removed from the Boltzmann operator of the above Equation 12, as in Equation 13 below.

$$S(x_1, \ldots, x_N) = \frac{\sum_{i=1}^{N} x_i e^{\wedge i}}{\sum_{i=1}^{N} e^{x_i}} \quad \text{[Equation 13]}$$

Meanwhile, in the case of the homomorphic ciphertext, since it is composed of a polynomial, applying an exponential function may incur a lot of computational cost. Since the role of the exponential function in the Boltzmann operator is to assign a lot of weight to large x values, it is not necessary to stick to the exponential function. That is, the electronic device 100 may apply a polynomial function (e.g., x2^k), which is a function that may perform a function similar to an exponential function (i.e., a function that assigns a large weight to a large value), to the Boltzmann operator instead of the exponential function (ex).

Therefore, according to an embodiment of the disclosure, the electronic device 100 may estimate the maximum value by using the following Equation 14, which corrects the exponential function (exi) in the Boltzmann operator of Equation 13 to the polynomial function (xi2^k).

$$S(x_1, \ldots, x_N) = \frac{\sum_{i=1}^{N} x_i x_i^{2^k}}{\sum_{i=1}^{N} x_i^{2^k}} = \frac{\sum_{i=1}^{N} x_i^{2^k+1}}{\sum_{i=1}^{N} x_i^{2^k}} \quad \text{[Equation 14]}$$

In this case, k is a parameter and may be any constant.

When the Boltzmann operator is modified to be suitable for the operation on the homomorphic ciphertext, the parameter a may no longer be required for the Boltzmann operator. However, according to an embodiment, the parameter c may be valid for the Boltzmann operator.

The degree K of the highest term disclosed in Equation 14 is an important parameter that directly affects the performance of estimating the maximum or minimum value. In this case, the larger the k value, the more precise the extreme value is acquired, but since the degree is high and a lot of multiplication is required, the computational complexity increases, so the computation time may be long. Therefore, k value may be a value between 4 and 7 according to the embodiment, but is not limited thereto.

According to an embodiment of the disclosure, the electronic device 100 may correct the Boltzmann operator of Equation 13 as in Equation 15 below by utilizing the fact that exp (−x)=1/exp (x), and estimate the minimum value using the corrected Boltzmann operator.

$$S_{min}(x_1, \ldots, X_N) = \frac{\sum_{i=1}^{N} x_i e^{-x_i}}{\sum_{i=1}^{N} e^{-x_i}} \approx \frac{\sum_{i=1}^{N} x_i x_i^{-2^k}}{\sum_{i=1}^{N} x_i^{-2^k}} \quad \text{[Equation 15]}$$

Here, the term $$x_i^{-2^k}$$

serves to assign a negative weight to $x_i$. In this case, the smaller the value of $x_i$, the larger the value of the corresponding term, so the contribution of relatively small values in the overall sum increases.

Meanwhile, since the term $$x_i^{-2^k}$$

in the denominator also acts more significantly as $x_i$ becomes smaller, the final value of S (x1, . . . , xN) will tend to be dominated by small ones. Based on this intuition, when the value of k is set sufficiently large, it may be expected that the modified Equation 15 above will converge close to the minimum value of the homomorphic ciphertext.

According to an embodiment of the disclosure, the electronic device 100 may estimate the maximum or minimum value using only the Boltzmann operator without using the tuning parameter acquired using the sample homomorphic ciphertext.

As described above, by estimating the extreme value using the Boltzmann operator according to various embodiments, the computational cost required to find the extreme value in homomorphically encrypted big data more quickly may be greatly reduced. In addition, the maximum or minimum value of data may be found in various applications such as cloud computing and machine learning by the method described above.

FIG. 4 and FIG. 5 are tables for describing simulation results for the accuracy and measurement time of the maximum value estimated by a conventional method and a method of the disclosure. In particular, FIG. 4 is a table for describing simulation results for the accuracy and measurement time of the maximum value estimated by the conventional method using the comparison operation and the method using the Boltzmann operator transformed into the polynomial of FIG. 14. In this case, k may be 5. As illustrated in FIG. 4, in the case of the method using the Boltzmann operator transformed into the polynomial of FIG. 14, the accuracy is somewhat lower than that of the conventional method, but it may be confirmed that the time is shortened by 0.11 to 0.75 times compared to the conventional method. In addition, FIG. 5 is a table for describing other simulation results for the accuracy and measurement time of the maximum value estimated by the conventional method using the comparison operation and the method using the Boltzmann operator transformed into the polynomial of FIG. 14. In this case, k may be 4. As illustrated in FIG. 5, in the case of the method using the Boltzmann operator transformed into the polynomial of FIG. 14, the accuracy is somewhat lower than that of the conventional method, but it may be confirmed that the time is shortened by 0.04 times (that is, 25 times speed) compared to the conventional method.

That is, as illustrated in FIGS. 4 and 5, according to an embodiment of the disclosure, the accuracy is somewhat lower, but this is not a large error, and the maximum value may be estimated more quickly than that of the conventional method.

Meanwhile, the methods according to various embodiments of the disclosure may be included and provided in a computer program product. The computer program product may be traded as a product between a seller and a purchaser. The computer program product may be distributed in the form of a machine-readable storage medium (for example, compact disc read only memory (CD-ROM)), or may be distributed (for example, download or upload) through an application store (for example, Play Store™) or may be directly distributed (for example, download or upload) between two user devices (for example, smart phones) online. In a case of the online distribution, at least some of the computer program products (for example, downloadable app) may be at least temporarily stored in a machine-readable storage medium such as a memory of a server of a manufacturer, a server of an application store, or a relay server or be temporarily created.

The methods according to various embodiments of the disclosure may be implemented by software including instructions stored in a machine-readable storage medium (for example, a computer-readable storage medium). A machine is a device capable of calling a stored instruction from a storage medium and operating according to the called instruction, and may include the electronic device of the disclosed embodiments.

Meanwhile, the machine-readable storage medium may be provided in a form of a non-transitory storage medium. Here, the "non-transitory storage medium" means that the storage medium is a tangible device, and does not include a signal (for example, electromagnetic waves), and the term does not distinguish between the case where data is stored semi-permanently on a storage medium and the case where data is temporarily stored thereon. For example, the "non-transitory storage medium" may include a buffer in which data is temporarily stored.

In a case where a command is executed by the processor, the processor may directly perform a function corresponding to the command or other components may perform the function corresponding to the command under a control of the processor. The command may include codes created or executed by a compiler or an interpreter.

Hereinafter, although exemplary embodiments of the disclosure have been illustrated and described, the disclosure is not limited to the above-described specific exemplary embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic device for estimating a maximum value or minimum value of a homomorphic ciphertext, comprising:

a communication device;

a memory configured to store at least one instruction; and a processor configured to be connected to the memory to control the electronic device, wherein the processor is configured to:

acquire a homomorphic ciphertext composed of N pieces of data, acquire a sample homomorphic ciphertext composed of B pieces of data from the homomorphic ciphertext, estimate a sample minimum value of the sample homomorphic ciphertext using a Boltzmann operator, acquire a tuning parameter using the estimated sample minimum value, correct the Boltzmann operator by applying the tuning parameter to the Boltzmann operator, and estimate the maximum value or minimum value of the homomorphic ciphertext using the corrected Boltzmann operator.

2. The electronic device as claimed in claim 1, wherein the Boltzmann operator is defined as in the following Equation, and $$S_{max}(x_1, \ldots, x_N) = \frac{\sum_{i=1}^{N} x_i e^{\alpha(x_i - c)}}{\sum_{i=1}^{N} e^{\alpha(x_i - c)}}$$

the processor is configured to calculate the maximum or minimum value through the following condition, $$\lim_{a \to \infty} S_a = x_{max} \lim_{a \to -\infty} S_\alpha = x_{min},$$

wherein, $x_i$ is the homomorphic ciphertext, a and c are parameters, $x_{max}$ is the maximum value, and $x_{min}$ is the minimum value.

3. The electronic device as claimed in claim 1, wherein the B is the number of data included in one data block.

4. The electronic device as claimed in claim 1, wherein the processor is configured to acquire a plurality of sample groups including the sample homomorphic ciphertext, acquire sample minimum values of each of the plurality of sample groups, and acquire a maximum value among the plurality of acquired sample minimum values as the tuning parameter.

5. The electronic device as claimed in claim 1, wherein the processor is configured to correct the Boltzmann operator as in the following equation using the tuning parameter, $$S_\alpha(x_1, \ldots, x_N) = \frac{\sum_{i=1}^{N} (x_i - c) e^{\alpha(x_i - c)}}{\sum_{i=1}^{N} e^{\alpha(x_i - c)}} + c$$

wherein, C is the tuning parameter.

6. The electronic device as claimed in claim 5, wherein the processor is configured to remove the parameter and tuning parameter from the corrected Boltzmann operator to estimate the maximum value or the minimum value using the following Equation $$S(x_1, \ldots, x_N) = \frac{\sum_{i=1}^{N} x_i e^{x_i}}{\sum_{i=1}^{N} e^{x^i}}.$$

7. The electronic device as claimed in claim 6, wherein the processor is configured to estimate the maximum value by using the following Equation, which corrects an exponential function to a polynomial in the Equation from which the parameter and tuning parameter are removed $$S(x_1, \ldots, x_N) = \frac{\sum_{i=1}^{N} x_i^{2^k+1}}{\sum_{i=1}^{N} x_i^{2^k}}.$$

8. A control method of an electronic device for estimating a maximum value or minimum value of a homomorphic ciphertext, comprising, through a processor:

acquiring the homomorphic ciphertext composed of N pieces of data;

acquiring a sample homomorphic ciphertext composed of B pieces of data from the homomorphic ciphertext;

estimating a sample minimum value of the sample homomorphic ciphertext using a Boltzmann operator;

acquiring a tuning parameter using the estimated sample minimum value;

correcting the Boltzmann operator by applying the tuning parameter to the Boltzmann operator, and estimating the maximum value or minimum value of the homomorphic ciphertext using the corrected Boltzmann operator.

9. The control method as claimed in claim 8, wherein the Boltzmann operator is defined as in the following Equation, and $$S_{max}(x_1, \ldots, x_N) = \frac{\sum_{i=1}^{N} x_i e^{\alpha(x_i - c)}}{\sum_{i=1}^{N} e^{\alpha(x_i - c)}}$$

the processor is configured to calculate the maximum or minimum value through the following condition, $$\lim_{a \to \infty} S_a = x_{max} \lim_{a \to -\infty} S_\alpha = x_{min},$$

wherein, $x_i$ is the homomorphic ciphertext, a and c is the parameters, $x_{max}$ is the maximum value, and $x_{min}$ is the minimum value.

10. The control method as claimed in claim 8, wherein the B is the number of data included in one data block.

11. The control method as claimed in claim 8, wherein the acquiring of the tuning parameter includes:

acquiring a plurality of sample groups including the sample homomorphic ciphertext;

acquiring sample minimum values of each of the plurality of sample groups; and acquiring a maximum value among the plurality of acquired sample minimum values as the tuning parameter.

12. The control method as claimed in claim 8, wherein in the correcting, the Boltzmann operator is corrected as in the following equation using the tuning parameter, $$S_\alpha(x_1, \ldots, x_N) = \frac{\sum_{i=1}^{N} (x_i - c) e^{\alpha(x_i - c)}}{\sum_{i=1}^{N} e^{\alpha(x_i - c)}} + c$$

wherein, C is the tuning parameter.

13. The control method as claimed in claim 12, wherein in the estimating of the maximum value or the minimum value, the parameter and tuning parameter are removed from the corrected Boltzmann operator to estimate the maximum value or the minimum value using the following Equation $$S_\alpha(x_1, \ldots, x_N) = \frac{\sum_{i=1}^{N} x_i e^{x_i}}{\sum_{i=1}^{N} e^{x^i}}.$$

14. The control method as claimed in claim 13, wherein in the estimating of the maximum value or the minimum value, the maximum value is estimated by using the following Equation, which corrects an exponential function to a polynomial in the Equation from which the parameter and tuning parameter are removed $$S(x_1, \ldots, x_N) = \frac{\sum_{i=1}^{N} x_i^{2^k+1}}{\sum_{i=1}^{N} x_i^{2^k}}.$$

* * * * *